(12) United States Patent
Hikida

(10) Patent No.: US 7,809,609 B2
(45) Date of Patent: Oct. 5, 2010

(54) SYSTEM, METHOD, AND COMPUTER READABLE STORAGE MEDIUM FOR THE PROCESSING OF PRINT ORDERS

(75) Inventor: Ayako Hikida, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/535,363

(22) Filed: Sep. 26, 2006

(65) Prior Publication Data

US 2007/0086452 A1 Apr. 19, 2007

(30) Foreign Application Priority Data

Oct. 14, 2005 (JP) .............................. 2005-300356

(51) Int. Cl.
G06Q 30/00 (2006.01)
G06F 17/30 (2006.01)
(52) U.S. Cl. .......................................... 705/26; 705/27
(58) Field of Classification Search ....................... 705/1, 705/26–27, 35
See application file for complete search history.

(56) References Cited

U.S. PATENT DOCUMENTS

| 6,332,133 | B1 * | 12/2001 | Takayama | 705/39 |
| 6,930,788 | B1 * | 8/2005 | Iwamoto et al. | 358/1.15 |
| 2001/0021311 | A1 * | 9/2001 | Mizumo | 396/429 |
| 2002/0046070 | A1 * | 4/2002 | Konishi | 705/7 |
| 2002/0046109 | A1 * | 4/2002 | Leonard et al. | 705/14 |
| 2002/0071678 | A1 * | 6/2002 | Garfinkle et al. | 396/429 |
| 2002/0082927 | A1 * | 6/2002 | Borenstein et al. | 705/21 |
| 2002/0194121 | A1 * | 12/2002 | Takayama | 705/39 |
| 2003/0135582 | A1 * | 7/2003 | Allen et al. | 709/217 |
| 2003/0149653 | A1 * | 8/2003 | Penney et al. | 705/37 |
| 2003/0149798 | A1 * | 8/2003 | Klatt et al. | 709/318 |

OTHER PUBLICATIONS

"PrintBid.com plug pulled". Printing World , p. 25 , Feb. 12, 2001.*

* cited by examiner

Primary Examiner—William J. Allen
(74) Attorney, Agent, or Firm—Canon U.S.A., Inc. I.P. Division

(57) ABSTRACT

When a user receives an online service by accessing a plurality of sites in turn, the user is immediately notified that the user cannot obtain the service since a certain site is out of service. A communication terminal accesses a first information processing apparatus and a second information processing apparatus in turn to execute communication, thereby obtaining the service. When a service intermediation apparatus receives a request for a service from the communication terminal, the service intermediation apparatus detects an operating state of the second information processing apparatus. Then, for example, if the second information processing apparatus is in operation, a link to the first information processing apparatus is provided as a response to the communication terminal. If the second information processing apparatus is out of operation, the link thereto is not provided.

5 Claims, 23 Drawing Sheets

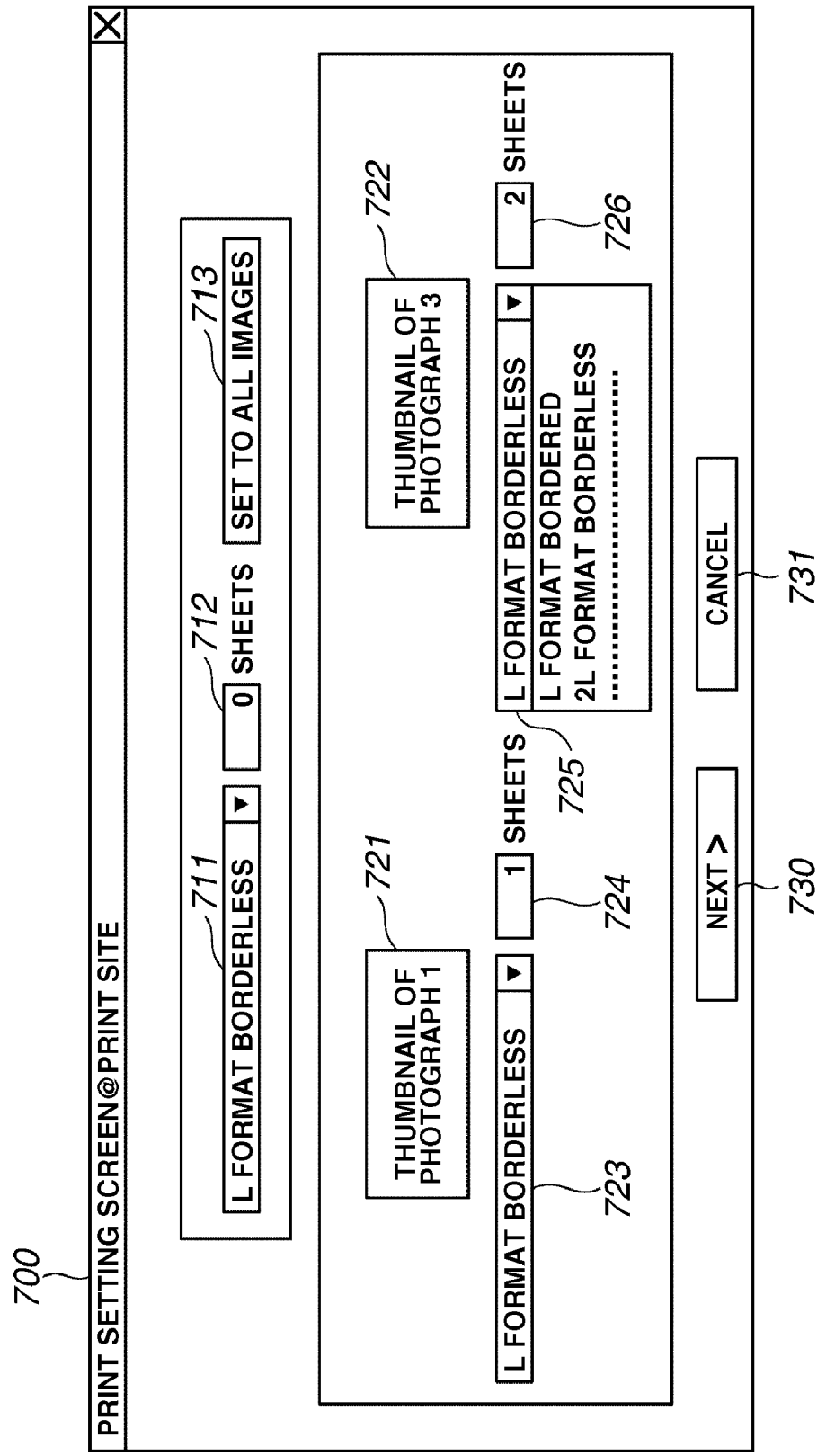

FIG.8

DELIVERY SETTING SCREEN@PRINT SITE — 800

ORDERING USER INFORMATION — 810

NAME MR/MS   FAMILY NAME SHIMOMARUKO   PERSONAL NAME TARO — 811

KANA MR/MS   FAMILY NAME シモマルコ   PERSONAL NAME タロウ — 812

POSTAL CODE [ 111-2222 ] — 813

ADDRESS [ SHIMOMARUKO 3-CHOME OHTA-KU TOKYO ] — 814

TELEPHONE NUMBER [ 03-1111-2222 ] — 815

MAIL ADDRESS   shimomaruko.taro@aaa.jp — 816

---

820

○ PACKAGE DELIVERY — 821    ◉ MAIL DELIVERY — 822

◉ SAME AS ODERING USER — 823    ○ DESIGNATE DELIVERY DESTINATION — 824

---

DELIVERY DESTINATION INFORMATION

NAME [ ] — 841

KANA [ ] — 842

POSTAL CODE [ ] — 843

ADDRESS [ ] — 844

TELEPHONE NUMBER [ ] — 845

MAIL ADDRESS [ ] — 846

[ < BACK ]   [ NEXT > ]   [ CANCEL ]
    830       831       832

FIG.9

PRINT ORDER CONFIRMATION SCREEN@PRINT SITE /900

ESTIMATION OF PRINT CHARGE /910
※ ALL LIST PRICES INCLUDE TAX

| PRODUCT NAME | UNIT PRICE | SHEETS | AMOUNT |
|---|---|---|---|
| L FORMAT BORDERLESS | 40 YEN | 3 | 120 YEN |
| MAIL DELIVERY CHARGE | | | 200 YEN |
| MODEST AMOUNT SETTLEMENT COMMISSION | | | 200 YEN |
| TOTAL (INCLUDING TAX) | | | 520 YEN (INCLUDING CONSUMPTION TAX 24YEN) |

ORDERING USER INFORMATION /930

NAME MR/MS    FAMILY NAME SHIMOMARUKO    PERSONAL NAME TARO

KANA MR/MS    FAMILY NAME シモマルコ    PERSONAL NAME タロウ

POSTAL CODE    111-2222

ADDRESS    SHIMOMARUKO 3-CHOME OHTA-KU TOKYO

TELEPHONE NUMBER    03-1111-2222

MAIL ADDRESS    shimomaruko.taro@aaa.jp

DELIVERY DESTINATION INFORMATION /940

NAME MR/MS    FAMILY NAME SHIMOMARUKO    PERSONAL NAME TARO

KANA MR/MS    FAMILY NAME シモマルコ    PERSONAL NAME タロウ

POSTAL CODE    111-2222

ADDRESS    SHIMOMARUKO 3-CHOME OHTA-KU TOKYO

TELEPHONE NUMBER    03-1111-2222

MAIL ADDRESS    shimomaruko.taro@aaa.jp

[< BACK]    [TO SETTLEMENT]    [CANCEL]

SETTLEMENT PROCEEDING SCREEN@SETTLEMENT SITE — 1000

SETTLEMENT AMOUNT — 1001

※ ALL LIST PRICES INCLUDE TAX

| PRODUCT NAME | UNIT PRICE | SHEETS | AMOUNT |
|---|---|---|---|
| L FORMAT BORDERLESS | 40 YEN | 3 | 120 YEN |
| MAIL DELIVERY CHARGE | | | 200 YEN |
| MODEST AMOUNT SETTLEMENT COMMISSION | | | 200 YEN |
| TOTAL (INCLUDING TAX) | | | 520 YEN (INCLUDING CONSUMPTION TAX 24YEN) |

CREDIT COMPANY [XXX CREDIT ASSOCIATION ▼] — 1002

CREDIT NUMBER [ ] — 1003

DATE OF EXPIRY [ ] MONTH / [ ] YEAR — 1004

OWNERSHIP [ ] — 1005

[START SETTLEMENT] — 1006   [CANCEL] — 1007

| USER INFORMATION TABLE ||||
|---|---|---|---|
| USER ID | NAME | PASSWORD | COUPON NUMBER |
| abc04567 | TARO SHIMOMARUKO | 1010abc | 0125867;3980095;2256789 |
| pwa13598 | HANAKO SATO | xyz1234 | 8964478 |
| qki56897 | ICHIRO SUZUKI | uxy777 | NULL |
| ... | ... | ... | ... |

| COUPON INFORMATION TABLE ||||||
|---|---|---|---|---|
| COUPON NUMBER | TARGET PRODUCT | DATE OF EXPIRY | STATE OF USE | USER ID |
| 0125867 | L FORMAT 10 SHEETS + DELIVERY CHARGE + COMMISSION | 2005/12/31 | UNUSED | abc04567 |
| 3980095 | 5000 YEN OF PRINT SITE C | 2010/06/30 | UNUSED | abc04567 |
| 2256789 | NO DELIVERY CHARGE OF PRINT SITE B | 2008/08/31 | USED | abc04567 |
| ... | ... | ... | ... | ... |

FIG.17

| PRINT SITE INFORMATION TABLE |||
|---|---|---|
| NAME | HANDLING PRODUCT | URL |
| PRINT SITE A | L FORMAT; 2L FORMAT; DELIVERY CHARGE; COMMISSION | http://www.aaa.co.jp |
| PRINT SITE B | POST CARD; MUG CUP; DELIVERY CHARGE; COMMISSION | http://www.bbb.com |
| PRINT SITE C | ALBUM BOOKBINDING; DELIVERY CHARGE; COMMISSION | http://www.c-shop.co.jp |
| ... | ... | ... |

COUPON PAYMENT SCREEN@PHOTO SITE — 2100

MR TARO SHIMOMARUKO
THANK YOU FOR USING THIS SITE EVERY TIME.

SETTLEMENT AMOUNT — 2101
※ ALL LIST PRICES INCLUDE TAX

| PRODUCT NAME | UNIT PRICE | SHEETS | AMOUNT |
|---|---|---|---|
| L FORMAT BORDERLESS | 40 YEN | 3 | 120 YEN |
| MAIL DELIVERY CHARGE | | | 200 YEN |
| MODEST AMOUNT SETTLEMENT COMMISSION | | | 200 YEN |
| TOTAL (INCLUDING TAX) | | | 520 YEN (INCLUDING CONSUMPTION TAX 24YEN) |

COUPON INFORMATION
[        ] 2102   [REFLECT] 2103

[<BACK] [CANCEL]
  2104    2105

FIG.21B

COUPON PAYMENT SCREEN@PHOTO SITE — 2100

MR TARO SHIMOMARUKO
THANK YOU FOR USING THIS SITE EVERY TIME.

SETTLEMENT AMOUNT — 2101
※ ALL LIST PRICES INCLUDE TAX

| PRODUCT NAME | UNIT PRICE | SHEETS | AMOUNT |
|---|---|---|---|
| L FORMAT BORDERLESS | 40 YEN | 3 | 120 YEN |
| MAIL DELIVERY CHARGE | | | 200 YEN |
| MODEST AMOUNT SETTLEMENT COMMISSION | | | 200 YEN |
| COUPON | | | -520 YEN |
| TOTAL (INCLUDING TAX) | | | 0 YEN (INCLUDING CONSUMPTION TAX 24YEN) |

COUPON INFORMATION
[0125867] 2102   [REFLECT] 2103

[<BACK] [CANCEL] [START SETTLEMENT]
  2104    2105      2106

FIG.22

COUPON PAYMENT SCREEN@PHOTO SITE — 2100

MR TARO SHIMOMARUKO

THANK YOU FOR USING THIS SITE EVERY TIME.

2101

※ ALL LIST PRICES INCLUDE TAX

| PRODUCT NAME | UNIT PRICE | SHEETS | AMOUNT |
|---|---|---|---|
| L FORMAT BORDERLESS | 40 YEN | 15 | 600 YEN |
| MAIL DELIVERY CHARGE | | | 200 YEN |
| MODEST AMOUNT SETTLEMENT COMMISSION | | | 200 YEN |
| COUPON | | | -800 YEN |
| TOTAL (INCLUDING TAX) | | | 200 YEN (INCLUDING CONSUMPTION TAX 24YEN) |

COUPON INFORMATION

2102: `0125867`  2103: [REFLECT]

2206: ⚠ THIS PRINT ORDER IS NOT ACCEPTABLE. AT PRESENT, SETTLEMENT SITE IS OUT OF SERVICE. PAYMENT OF SUPPLEMENTARY CHARGES CANNOT BE ACCEPTED. PLEASE CHANGE TO OTHER COUPONS OR CHANGE THE CONTENTS OF ORDER.

[<BACK] 2104   [CANCEL] 2105

SYSTEM, METHOD, AND COMPUTER READABLE STORAGE MEDIUM FOR THE PROCESSING OF PRINT ORDERS

BACKGROUND OF THE INVENTION

1. Field of the Invention

The present invention relates to a service intermediation apparatus for interconnecting an online service, which is provided by utilizing a plurality of information processing apparatuses, and a user.

2. Description of the Related Art

There have been intermediation sites that provide a user with online shopping services. These sites successively provide a client terminal with, for example, a link to a shopping site for ordering products online and a link to a settlement site for settling purchase expenses of the products.

Further, conventionally, when a server has received an alarm from devices, an abnormality of these devices is notified to a client terminal by changing screen information. According to this conventional technique, if the shopping site is in an out-of-service state due to an occurrence of a failure, the intermediation site only notifies the client terminal of the state or notifies the client terminal without providing a link to the shopping site. Further, if the settlement site is in an out-of-service state due to occurrence of a failure, the intermediation site only notifies the client terminal of the state or notifies the client terminal without providing a link to the settlement site. That is, in this conventional technique, the intermediation site is only able to notify the client terminal of the operating state in a site having a change or an abnormality.

Accordingly, even if the settlement site has an abnormality and is out of service, if the shopping site is available, a user can first access the shopping site in accordance with a link provided by the intermediation site. Then, the user carries out a procedure for an order. The procedure includes inputting selection of a type of products, the number of products, user information, and delivery information, and transmitting this information to the shopping site. Then, the user acknowledges the state that the user cannot purchase the products, since the user cannot utilize the settlement site to carry out settlement processing. That is, although the user finally cannot purchase the products, the user has carried out a wasteful operation such that the user accesses the shopping site to carry out the procedure for ordering the products.

SUMMARY OF THE INVENTION

The present invention is directed to quickly notifying a user that a service itself cannot be provided if at least one information processing apparatus is in an unavailable state among a plurality of information processing apparatuses, when a service intermediation apparatus successively utilizes the plurality of information processing apparatuses to provide a client terminal with an online service.

According to an aspect of the present invention, a printing service intermediation apparatus capable of communicating with an external device via a network includes an upload unit configured to upload an image file from a communication terminal; a storage unit configured to store first link information which is utilized for access to a print processing device that executes printing of the image file and second link information which is utilized for access to a settlement device that executes settlement of an expense involved in the printing; a first transmission control unit configured to perform control to transmit the first link information to the communication terminal in response to a request from the communication terminal; a second transmission control unit configured to perform control to transmit the second link information to the communication terminal in response to a request from the print processing device that has received access from the communication terminal based on the first link information; and a detection unit configured to detect an operating state of the settlement device, wherein the first transmission control unit controls whether to transmit the first link information to the communication terminal according to a detection result provided by the detection unit.

According to another aspect of the present invention, the first transmission control unit does not transmit the first link information if the detection result indicates that the settlement device is out of operation.

According to yet another aspect of the present invention, the printing service intermediation apparatus may further include a management unit configured to manage user information on the communication terminal, wherein the first transmission control unit controls whether to transmit the first link information to the communication terminal further according to the user information managed by the management unit.

According to still another aspect of the present invention, the printing service intermediation apparatus may further include an image file transmission unit configured to transmit the uploaded image file to the print processing device.

Moreover, according to yet another aspect of the present invention, the printing service intermediation may further include a coupon information management unit configured to manage coupon information on a coupon for a user of the communication terminal; and a coupon settlement unit configured to settle an expense involved in printing of the image file based on the coupon information, wherein the first transmission control unit controls whether to transmit the first link information to the communication terminal further according to the coupon information managed by the coupon information management unit.

Additionally, according to another aspect of the present invention, an online service intermediation apparatus is provided which is capable of communicating with an external device via a network. The online service intermediation apparatus includes a storage unit configured to store first link information which is utilized for access to a first information processing apparatus and second link information which is utilized for access to a second information processing apparatus; a first transmission unit configured to read the first link information from the storage unit to transmit the read the first link information to a communication terminal in response to a request from the communication terminal; a second transmission unit configured to read the second link information from the storage unit to transmit the read second link information to the communication terminal in response to a request from the communication terminal that has accessed the first information processing apparatus based on the first link information; an acquisition unit configured to acquire information on an operating state of the second information processing apparatus; and a control unit configured to control whether to cause the first transmission unit to transmit the first link information to the communication terminal according to the information on the operating state of the second information processing apparatus acquired by the acquisition unit.

Furthermore, according to yet another aspect of the present invention, a method is provided for controlling a printing service intermediation apparatus capable of communicating with an external device via a network. Here, the method includes uploading an image file from a communication terminal; storing first link information which is utilized for access to a print processing device that executes printing of the image file and second link information which is utilized for access to a settlement device that executes settlement of an expense involved in the printing; performing control to transmit the first link information to the communication terminal in response to a request from the communication terminal; performing control to transmit the second link information to the communication terminal in response to a request from the print processing device that has received access from the communication terminal based on the first link information; detecting an operating state of the settlement device; and controlling whether to transmit the first link information to the communication terminal according to the detected operating state.

Also, according to another aspect of the present invention, a method is provided for controlling an online service intermediation apparatus capable of communicating with an external device via a network. The method includes storing, in a storage unit, first link information which is utilized for access to a first information processing apparatus and second link information which is utilized for access to a second information processing apparatus; reading the first link information from the storage unit to transmit the read first link information to a communication terminal in response to a request from the communication terminal; reading the second link information from the storage unit to transmit the read second link information to the communication terminal in response to a request from the communication terminal that has accessed the first information processing apparatus based on the first link information; acquiring information on an operating state of the second information processing apparatus; and controlling whether to transmit the first link information to the communication terminal according to the acquired information on the operating state of the second information processing apparatus.

Still further, according to yet another aspect of the present invention, a computer readable medium is provided which contains computer-executable instructions for controlling a printing service intermediation apparatus capable of communicating with an external device via a network. Here, the computer readable medium includes computer-executable instructions for uploading an image file from a communication terminal; computer-executable instructions for storing first link information which is utilized for access to a print processing device that executes printing of the image file and second link information which is utilized for access to a settlement device that executes settlement of an expense involved in the printing; computer-executable instructions for performing control to transmit the first link information to the communication terminal in response to a request from the communication terminal; computer-executable instructions for performing control to transmit the second link information to the communication terminal in response to a request from the print processing device that has received access from the communication terminal based on the first link information; computer-executable instructions for detecting an operating state of the settlement device; and computer-executable instructions for controlling whether to transmit the first link information to the communication terminal according to the detected operating state.

And, according to yet another aspect of the present invention, a computer readable medium is provided containing computer-executable instructions for controlling an online service intermediation apparatus capable of communicating with an external device via a network. The computer readable medium includes computer-executable instructions for storing, in a storage unit, first link information which is utilized for access to a first information processing apparatus and second link information which is utilized for access to a second information processing apparatus; computer-executable instructions for reading the first link information from the storage unit to transmit the read first link information to a communication terminal in response to a request from the communication terminal; computer-executable instructions for reading the second link information from the storage unit to transmit the read second link information to the communication terminal in response to a request from the communication terminal that has accessed the first information processing apparatus based on the first link information; computer-executable instructions for acquiring information on an operating state of the second information processing apparatus; and computer-executable instructions for controlling whether to transmit the first link information to the communication terminal according to the acquired information on the operating state of the second information processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features and aspects of the present invention and, together with the description, serve to explain the principles of the invention.

FIG. 7 is a diagram showing an example of a print setting screen according to an exemplary embodiment.

FIG. 8 is a diagram showing an example of a delivery setting screen according to an exemplary embodiment.

FIG. 9 is a diagram showing an example of a print order confirmation screen according to an exemplary embodiment.

FIG. 10 is a diagram showing an example of a settlement procedure screen according to an exemplary embodiment.

FIG. 15 is a diagram showing an example of a user information table according to an exemplary embodiment.

FIG. 16 is a diagram showing an example of a coupon information table according to an exemplary embodiment.

FIG. 17 is a diagram showing an example of a print site information table according to an exemplary embodiment.

FIGS. 21A and 21B are diagrams showing an example of a coupon payment screen according to an exemplary embodiment.

FIG. 22 is a diagram showing an example of a coupon payment screen according to an exemplary embodiment.

DETAILED DESCRIPTION OF THE EMBODIMENTS

Exemplary embodiments, features and aspects of the present invention will now herein be described in detail below with reference to the drawings.

First Exemplary Embodiment

[Exemplary Configuration of System]

First, referring to FIG. 1, an example configuration of an online service distribution system according to an exemplary embodiment will be described.

A client communication terminal 101 is provided which is operable by a user and of which may be configured by a computer. The client communication terminal 101 can communicate, for example, by a Hyper Text Transfer Protocol (HTTP). The client communication terminal 101 mutually communicates with various types of web servers via the Internet 103. Further, a web browser is installed on the client communication terminal 101. The web browser receives a web page file written by Hyper Text Markup Language (HTML) from various types of web servers. The web browser reproduces a page layout in accordance with a tag of the HTML. The web browser reproduces content such as a character, an image, a motion picture, and a voice. An image input device 102 reads an image from, for example, a digital camera, a digital video camera, and a scanner, and records the image as digital data. The client communication terminal 101 is connected to the image input device 102 by wired or wireless communication, acquires an image file recorded on the image input device 102, and stores the image file on a hard disk.

Figure 1:
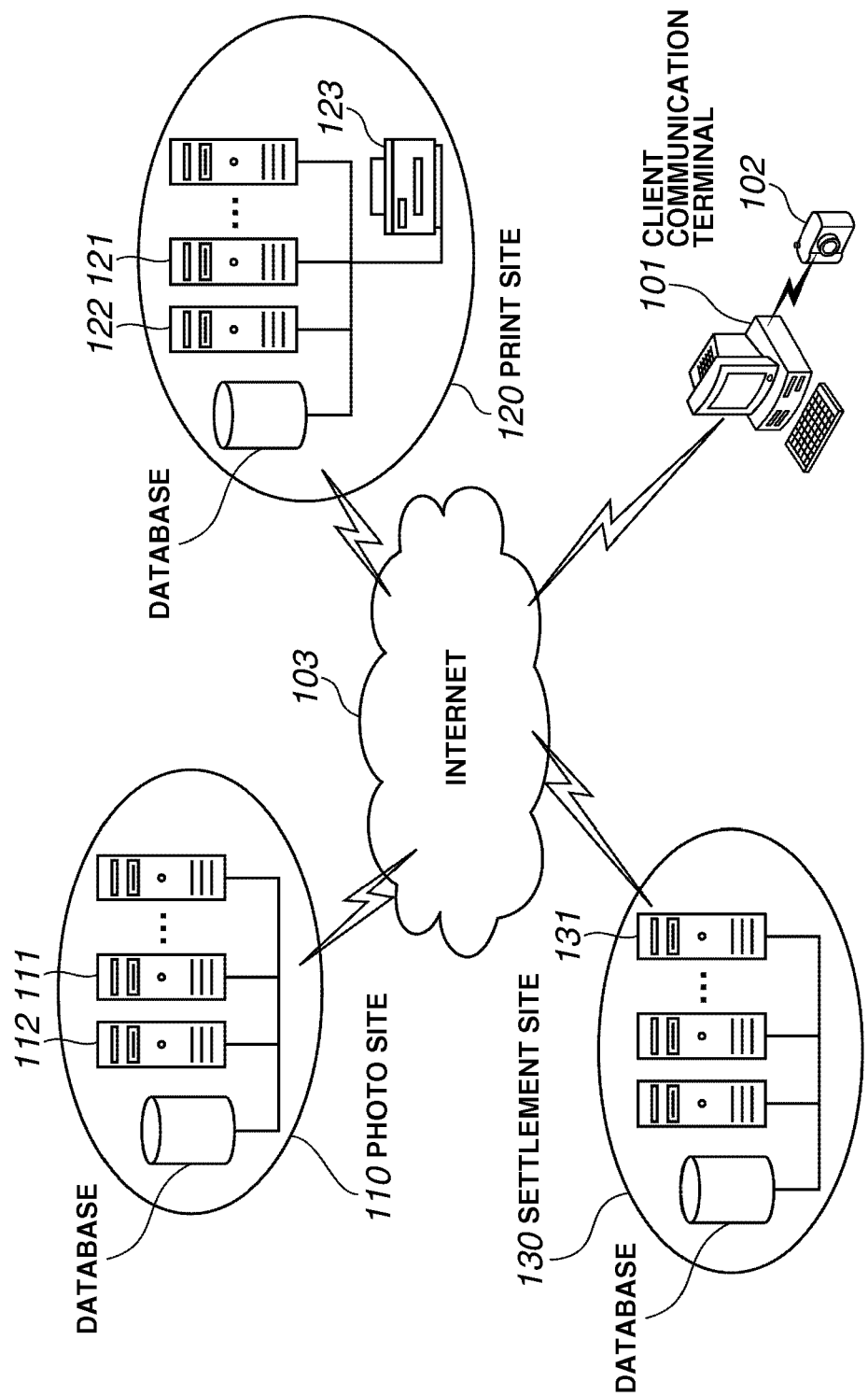
FIG. 1 is a block diagram showing an example configuration of a system according to an exemplary embodiment.

Still referring to FIG. 1, sites 110, 120, and 130 include web servers that provide content to be reproduced by a web browser to the client communication terminal 101.

A photo site 110 is configured by a web server 111, a database server 112, and the like. The web server 111 provides services such as uploading of an image file and transfer of a print order for an image file to the client communication terminal 101. Uploaded image files and information on a user of the client communication terminal 101, a print site 120, and a settlement site 130 are stored on a hard disk. The database server 112 manages the database of this information. The information concerning the print site 120 and the settlement site 130 includes link information (for example, URL) which is necessary when the client communication terminal 101 accesses these sites via the Internet 103. This link information is acquired by the web server 111 beforehand and stored in the database server 112. Alternatively, if the link information is requested from the client communication terminal 101, the link information can be acquired from the web servers of these sites and stored in a RAM or a hard disk.

The print site 120 is configured by a web server 121, a print server 122, and a printer 123. The web server 121 receives a print order for an image file stored in the hard disk of the photo site 110 from the client communication terminal 101. The print server 122 receives printing data on the image file from the web server 111 of the photo site 110 and transfers the printing data to the printer 123. The printer 123 executes printing based on the printing data. Note that the printing data is generated by converting the high resolution image file 204 at the photo site 110 or the print site 120.

The settlement site 130 is configured by a web server 131 to settle an expense involved in print processing of an image file with a user of the client communication terminal 101.

It is noted that each of the photo side 110, the print site 120, and the settlement site 130 can provide a server other than the above-described server. For example, a mail server for transmitting and receiving an electronic mail is included.

Figure 2:
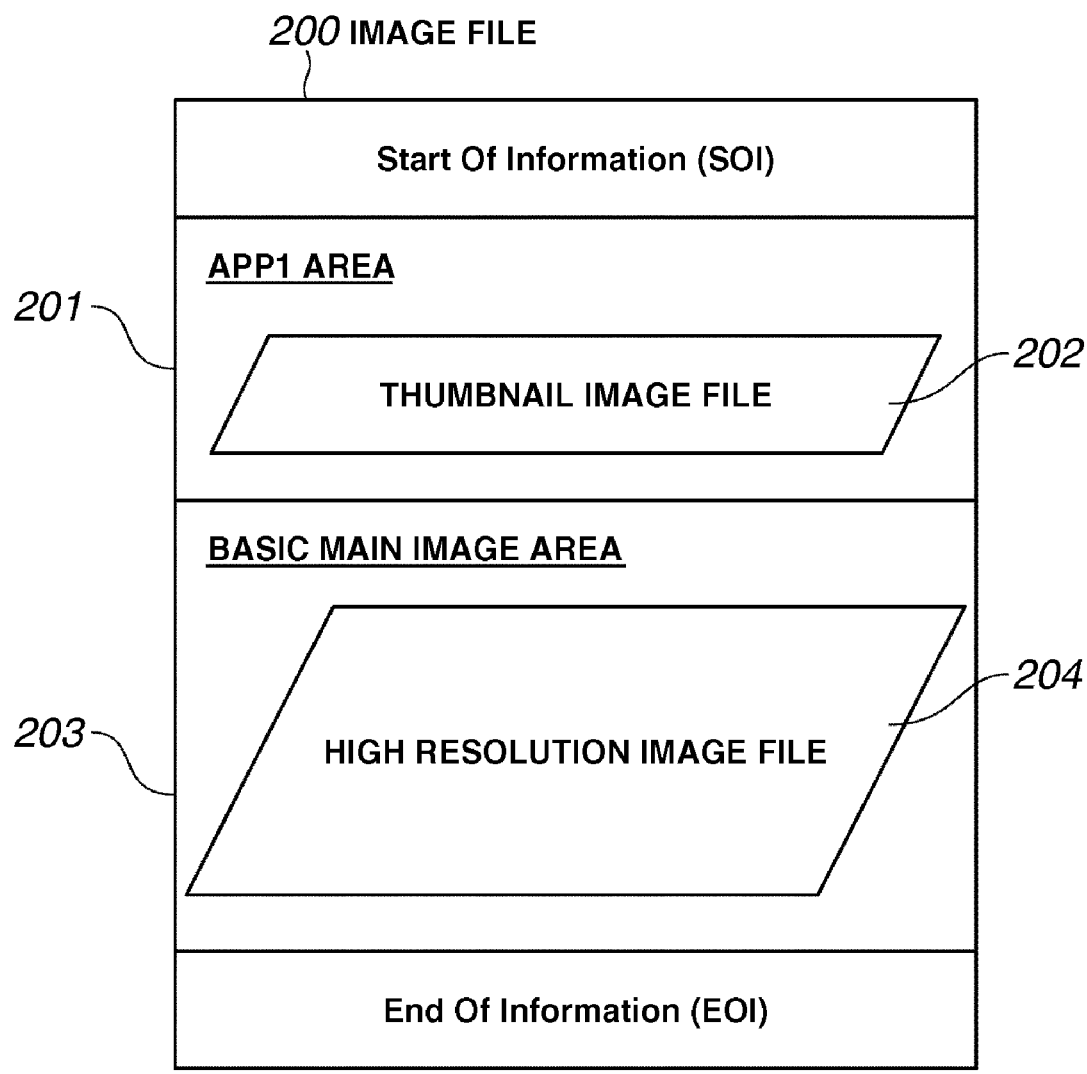
FIG. 2 is a diagram showing an example configuration of an image file according to an exemplary embodiment.

Next, an example structure of an image file in the present embodiment will be described with reference to FIG. 2. For example, an image file has a structure based on the Design rule for Camera File system (DCF). In an image file 200, a thumbnail image file 202 is stored in an APP1 area 201. Further, a high resolution image file 204 is stored in a DCF basic main image area 203. Further, in the APP1 area 201, Exif information can also be stored.

Next, an exemplary computer including a server which is provided in each site described above or a client communication terminal will be described with reference to FIG. 3. Note that each of the server and the client communication terminal can be configured by a single computer. It can also be configured by distributing each function over a plurality of computers corresponding to a requirement. If it is configured by a plurality of computers, these computers are connected by a communication line such as a local area network (LAN) so as to be mutually communicable.

Figure 3:
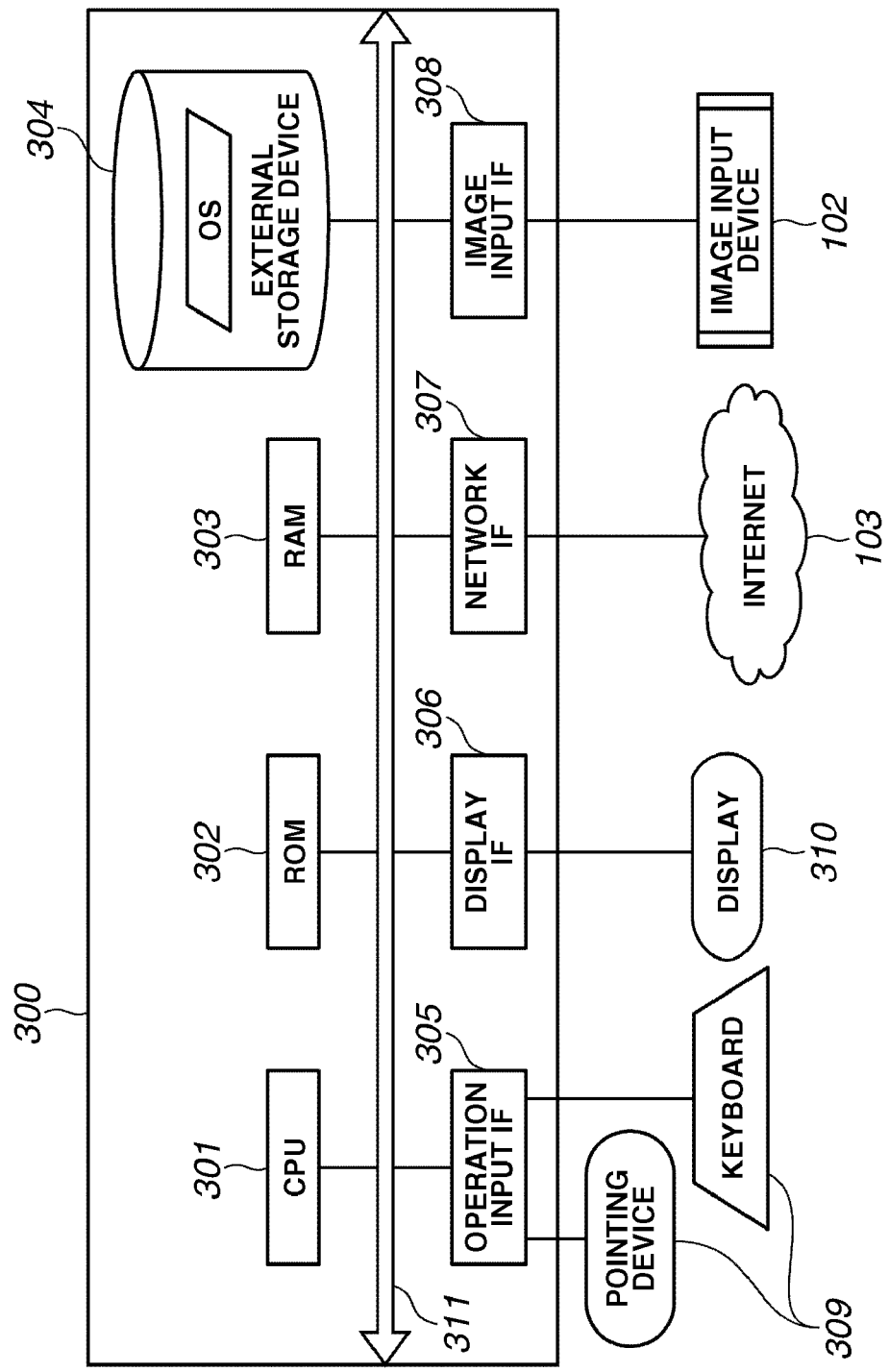
FIG. 3 is a block diagram showing an example configuration of a computer according to an exemplary embodiment.

Now referring to FIG. 3, a central processing unit (CPU) 301 controls the computer 300. In a read-only memory (ROM) 302, non-rewritable information is stored. A random access memory (RAM) 303 temporarily stores programs and data supplied from an external storage device 304. The external storage device 304 includes a hard disk (HDD) fixedly mounted on the computer 300 or a recording medium detachably attached to the computer 300. The external storage device 304 is stored with an operating system (OS). The external storage device 304 of the client communication terminal 101 is stored with image files acquired from a web browser or the image input device 102. The external storage device 304 of each site is stored with a web application program. An operation input interface 305 serves as an interface to an operation input device 309 such as a pointing device and a keyboard which are operated by a user. A display interface 306 serves as an interface to a display 310 for displaying data held by the computer 300 or data supplied from an external device. A network interface 307 serves for connecting to a network line such as the Internet 103. An image input interface 308 serves as an interface to the image input device 102. A bus 311 serves for communicably connecting each of units 301 to 308 mutually. Note that each of the web server and the client communication terminal does not need to provide all of the above-described units.

[Exemplary Procedure for Online Print Order]

Figure 4:
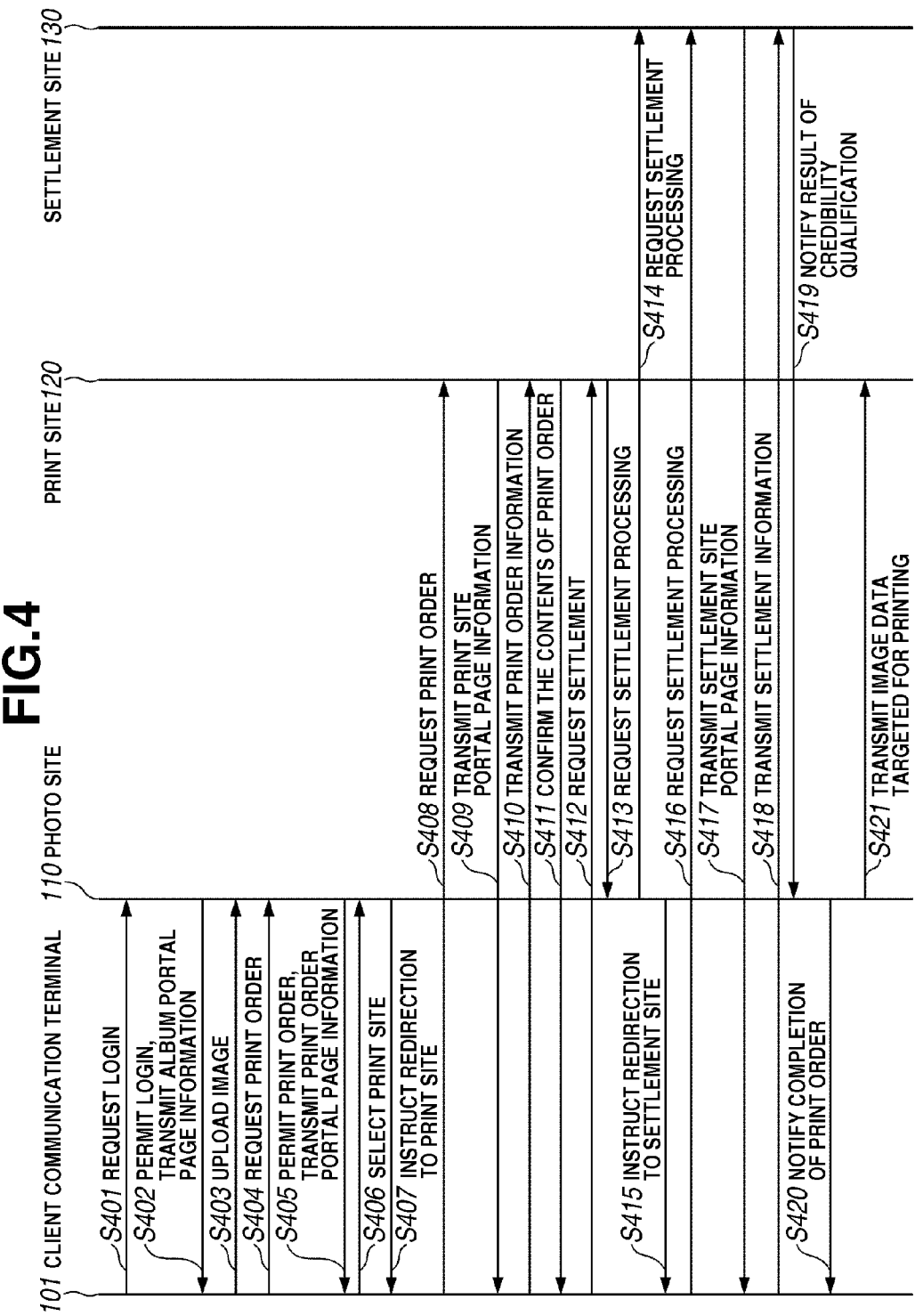
FIG. 4 is a flowchart showing an example procedure for print order processing according to an exemplary embodiment.

An exemplary procedure for an online print order for images in the present embodiment will be described with reference to FIG. 4. Note that each CPU 301 of each server of the photo site 110, the print site 120, and the settlement site 130 and the client communication terminal 101 reads program code and executes various processing to implement the following procedure.

First, the client communication terminal 101 starts the web browser, inputs URL information on the photo site 110, and transmits a request for access to the photo site 110. As a response to this access request, the client communication terminal 101 receives a web page file of a login screen from the photo site 110 to display the login screen on the web browser. Then, the client communication terminal 101 transmits a user ID and a password to the photo site 110. The user ID and the password are input in accordance with the contents of the login screen which are displayed on the web browser. As a result, the client communication terminal 101 requests login to the photo site 110 (step S401).

The photo site 110 responds to the login request to authenticate the login of the client communication terminal 101. When the photo site 110 authenticates the client communication terminal 101 to permit login, the photo site 110 transmits the web page file of an image album browsing screen to the client communication terminal 101 (step S402). It is noted that exemplary details of a processing procedure executed by the photo site 110 in step S402 will be described later.

Figure 5:
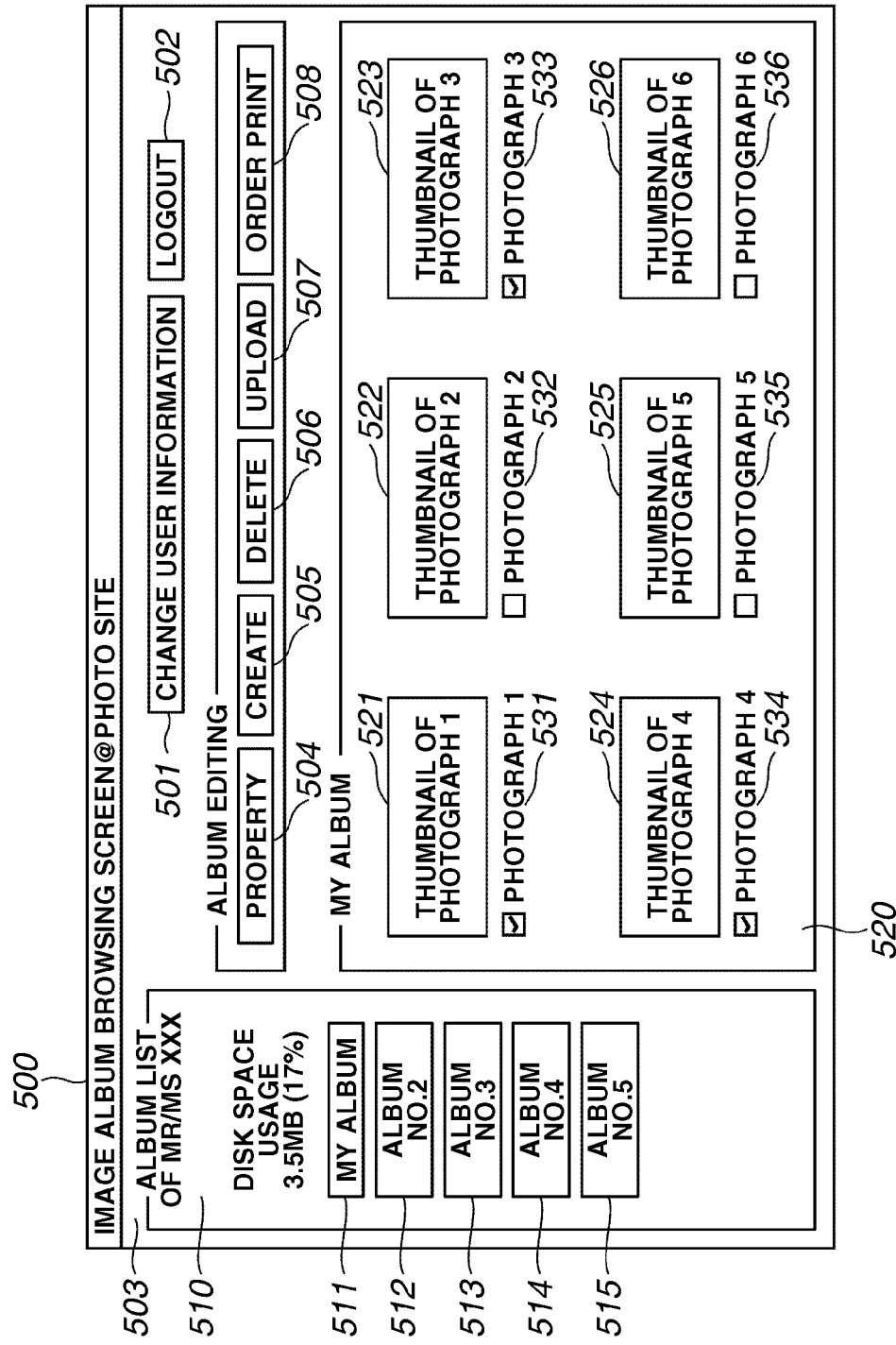
FIG. 5 is a diagram showing an example of an image album browsing screen according to an exemplary embodiment.

An example of the image album browsing screen is shown in FIG. 5. Note that in the present embodiment, the photo site 110 collectively manages one or more image files in album units. In FIG. 5, on an image album browsing screen 500, a button 501 for requesting a change of user information and a button 502 for requesting logout from the photo site 110 are displayed. Further, on an area 503, various types of buttons for requesting editing of albums which are displayed on the image album browsing screen 500 are placed. For example, a button 504 for requesting setting of a property of an album, a button 505 for requesting creation of a new album, and a button 506 for requesting deletion of a displayed album are displayed. A button 507 serves to generate an instruction to upload an image file stored in the hard disk of the client communication terminal 101 to the photo site 110. A button 508 serves to request a print order for an image file. On an area 510, buttons 511 to 515 for requesting displaying of an album are displayed. The album is configured by image files uploaded from the client communication terminal 101 to the photo site 110. Thumbnail images 521 to 526 of image files included in an album corresponding to a button selected and designated from among the buttons 511 to 515 are displayed on an area 520. By checking check boxes 531 to 536, image files are selected and designated as an object of operation editing.

Now referring back to FIG. 4, the client communication terminal 101 selects an image file stored in the hard disk to upload the image file to the photo site 110 (step S403). The photo site 110 stores the uploaded image file in the hard disk and manages the image file in the database server 112. In the present embodiment, the photo site 110 can determine whether to store the image file based on attribute information such as a type or a size of the uploaded image file. Further, the photo site 110 can notify the client communication terminal 101 that the image file is normally uploaded to the photo site 110. Note that the image file uploaded by the client communication terminal 101 can be an image captured by the image input device 102 or acquired from another device.

In response to a user pressing the button 508 (from FIG. 5) on the album browsing screen 500 to request a print order, the client communication terminal 101 requests the photo site 110 to start a procedure for a print order (step S404).

Next, the photo site 110 transmits the web page file of a print order portal screen to the client communication terminal 101 (step S405). On the print order portal screen, information for selecting the print site 120 is written. Note that the detail of a processing procedure executed by the photo site 110 in step S405 will be described later. The photo site 110 stores and manages information concerning the print site 120, for example, such as a name, a logo or URL information thereof in the database server 112. On the basis of this information, the photo site 110 generates a web page file for displaying the print order portal screen.

Figure 6:
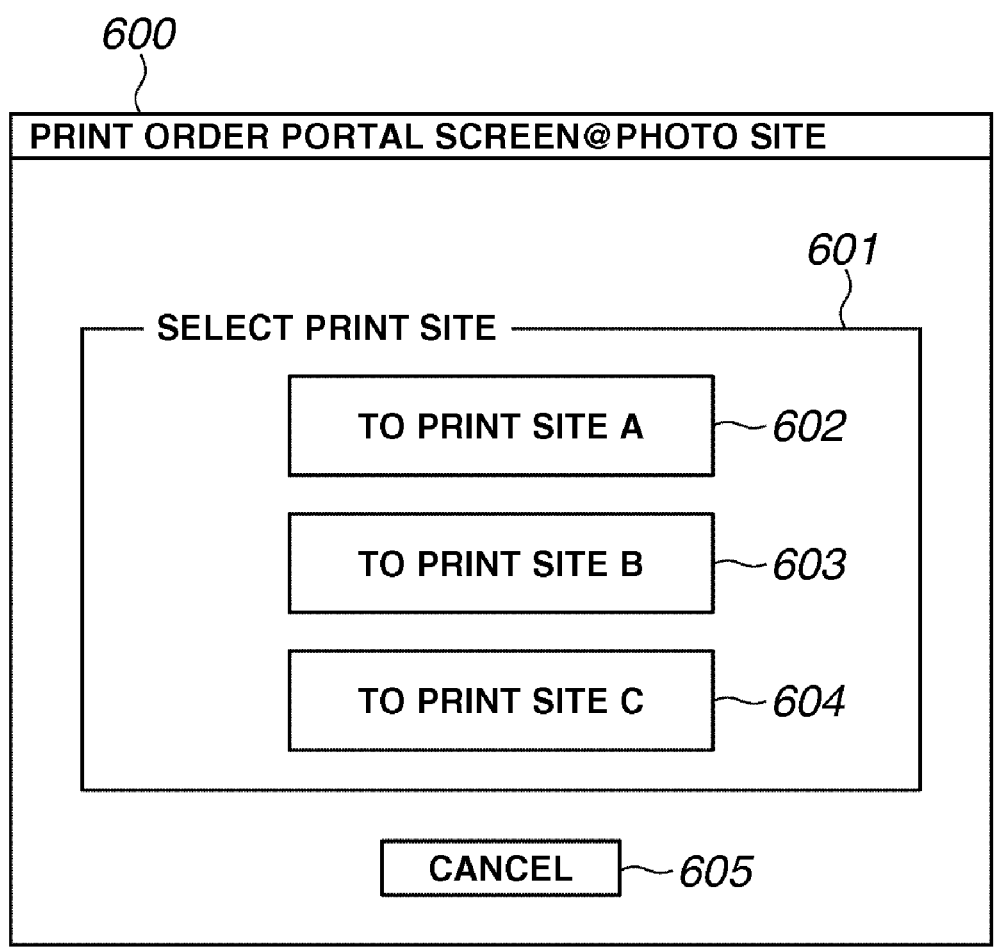
FIG. 6 is a diagram showing an example of a print order portal screen according to an exemplary embodiment.

The client communication terminal 101 receives the web page file of the print order portal screen from the photo site 110 to display the print order portal screen on the web browser. An example of the print order portal screen is shown in FIG. 6. On a print site list display part 601 of a print order portal screen 600, buttons 602 to 604 for designating a print site A, a print site B, and a print site C are displayed. The print site A, the print site B, and the print site C can be utilized by a user of the client communication terminal 101. The buttons 602 to 604 are associated with link information on the print sites A to C. A cancel button 605 is also displayed which generates an instruction to cancel selection of a print site. If a user selects a desired print site among print sites displayed on the print order portal screen 600, the client communication terminal 101 notifies the selected print site to the photo site 110 (step S406).

Referring back to FIG. 4, the photo site 110 reads URL information for accessing the print site notified in step S406 from the database or the hard disk. Then, the photo site 110 transmits the read URL information to the client communication terminal 101 and instructs the client communication terminal 101 to execute redirected connection (step S407). The client communication terminal 101 accesses the print site 120 based on the URL information on the print site 120 received from the photo site 120 to request a print order (step S408). In response to the print order request, the print site 120 transmits the web page file of a portal screen at the print site 120 to the client communication terminal 101 (step S409).

The client communication terminal 101 first receives the web page file of a print setting screen from the print site 120 to display the print setting screen on the web browser. Here, an example of the print setting screen to be displayed on the web browser of the client communication terminal 101 will be described with reference to FIG. 7.

Referring to FIG. 7, on a print setting screen 700, thumbnail images 721 and 722 of image files, entry fields 723 and 725 for the size of printing paper, and entry fields 724 and 726 for the number of printing paper sheets are displayed. The thumbnail image 721 corresponds to an image file which has been uploaded from the client communication terminal 101 to the photo site 110 and stored in album units. An image file corresponding to a thumbnail image, in which a numeral of 1 or larger is entered in the entry field 724 or 726 for the number of printing paper sheets, serves as an object of printing. Further, an entry field 711 for the size of printing paper and an entry field 712 for the number of printing paper sheets when the same print setting is carried out on a plurality of images together are displayed. Furthermore, a button 713 for generating an instruction to carry out the same print setting on a plurality of images together is also displayed. When a numeral of 1 or larger is entered in the entry field 712 for the number of printing paper sheets, all image files become an object of printing. Also, a button 730 for generating an instruction to proceed with a procedure for a print order and a button 731 for generating an instruction to cancel the print order are also displayed.

Next, the client communication terminal 101 receives the web page file of a setting screen concerning delivery of a print from the print site 120 and displays the delivery setting screen on the web browser. Here, an example of the delivery setting screen to be displayed on the web browser at the client communication terminal 101 will be described with reference to FIG. 8.

Now referring to FIG. 8, on an ordering user information field 810 of a delivery setting screen 800, the name 811, the kana 812, and the mail address 816 of a user of the client communication terminal 101 logged into the photo site 110 are displayed. Further, a postal code entry field 813, an address entry field 814, and a telephone number entry field 815 are displayed. As delivery information, radio buttons 821 and 822 are displayed which serve to select either of delivery methods of package delivery and mail delivery. Additionally, controls 823 and 824 are displayed which serve to select whether a delivery destination is the same as the ordering user or is designated separately. Then, if the delivery destination is designated separately from the ordering user, that is, if the control 824 is checked, an entry field for entering information on the delivery destination is displayed. For example, these are a name entry field 841, a kana entry field 842, a postal code entry field 843, an address entry field 844, a telephone number entry field 845, and a mail address entry field 846 of the delivery destination. Further, a button 830 for generating an instruction to return a procedure for the print order to the previous step, a button 831 for generating an instruction to proceed with a procedure for the print order, and a button 832 for generating an instruction to cancel a print order are also displayed.

Referring back to FIG. 4, a user enters information necessary for a print order in accordance with the contents displayed on the print setting screen 700 and the delivery setting screen 800 which are displayed on the web browser. Then, the client communication terminal 101 transmits the entered print order information to the print site 120 (step S410).

The print site 120 calculates and acquires expenses for printing processing of an image file, delivery of a print, a consumption tax, and a commission based on the print order information received from the client communication terminal 101. The print site 120 transmits web page information to the client communication terminal 101, which serves to display a print order confirmation screen on the web browser (step S411). The print order confirmation screen is a screen used for a user to confirm the contents of a print order such as calculated expenses, ordered products, the number of products, or the like.

An example of the print order confirmation screen in the present embodiment will be described with reference to FIG. 9. Referring to FIG. 9, on an estimation field 910 for a print charge of the print order confirmation screen 900, a product name, a unit price, the number of prints, a charge for every product, a delivery charge, a settlement commission, and the total amount thereof are displayed. Further, for confirmation, ordering user information 930 and delivery destination information 940 are also displayed. Furthermore, a button 950 for generating an instruction to return a procedure for the print order to the previous step, a button 960 for generating an instruction to proceed with a procedure for the print order to settle the amount, and a button 970 for generating an instruction to cancel the print order are also displayed.

Referring back to FIG. 4, in step S411, if a user approves an amount that has been notified from the print site 120 and indicated on the print order confirmation screen 900 and presses the button 960, the client communication terminal 101 instructs the print site 120 to settle the amount (step S412). Then, the print site 120 requests the photo site 110 to settle an expense involved in a print order asked from the client communication terminal 101 (step S413). The photo site 110 transmits information necessary for settlement of a print order such as an ordered product, the number of products, a delivery charge, and an expense involved in the print order to the settlement site 130, and requests settlement processing (step S414).

Next, the photo site 110 reads URL information used for the client communication terminal 101 to access the settlement site 130 from the database or the hard disk. The photo site 110 transmits the read URL information to the client information terminal 101 and instructs the settlement site 130 to execute redirected connection (step S415). The client communication terminal 101 accesses the settlement site 130 based on the URL information of the settlement site 130 received from the photo site 110 to request settlement processing (step S416).

In response to the settlement request, the settlement site 130 transmits the web page file of a settlement procedure screen at the settlement site 130 to the client communication terminal 101 (step S417). The settlement site 130 is managed by financial institutions such as banks and credit companies that provide electronic banking services.

The client communication terminal 101 receives the web page file of the settlement procedure screen to display the screen of the settlement site 130 on the web browser. An example of the settlement procedure screen is shown in FIG. 10. On a settlement procedure screen 1000, a settlement amount 1001, a credit company designation column 1002, a credit card number entry field 1003, an expiry date entry field 1004, and an ownership name entry field 1005 are displayed. A button 1006 for generating an instruction to start settlement and a button 1007 for generating an instruction to cancel settlement are also displayed. A user enters information necessary for settlement in accordance with the contents of the displayed settlement procedure screen 1000.

Returning to FIG. 4, next, the client communication terminal 101 transmits the entered settlement information to the settlement site 130 (step S418). The settlement site 130 qualifies credibility based on the settlement information received from the client communication terminal 101. The credibility qualification is performed to determine whether a user of the client communication terminal 101 has the ability to pay on the basis of the settlement information. Then, the settlement site 130 notifies the photo site 110 of a result of the credibility qualification (step S419).

As the result of the credibility qualification, if the client communication terminal 101 has the ability to pay, the photo site 110 notifies the client communication terminal 101 that the print order has been received and the order processing ends (step S420). On the other hand, as the result of the credibility qualification, if the client communication terminal 101 does not have the ability to pay, the photo site 110 notifies the client communication terminal 101 that the print order has not been received and the order processing ends (step S420).

As a result of the credibility qualification, if the client communication terminal 101 has the ability to pay, the photo site 110 instructs the print site 120 to execute printing based on the print order. Then, the photo site 110 reads an image file to be an object of printing from the database server 112 and transmits the image file to the print site 120 (step S421).

Then, in the print site 120, the web server 121 receives the image file to convert it into printing data and transfers the printing data to the print server 121. When the print server 121 transmits the printing data to the printer 123, the printer 123 prints the printing data to output prints. Further, an operator at the print site 120 works to deliver the prints to an address designated by the user.

Next, an exemplary processing procedure that is executed by the photo site 110 in step S402 will be described with reference to FIG. 11. The CPU 301 of each server included in the photo site 110 reads program code and executes various processing. Thus, the following procedure is implemented.

First, the photo site 110 stores a user ID for identifying a user permitted for login and a password corresponding thereto as user registration information in the hard disk, and manages the user registration information in the database server 112. Then, the photo site 110 determines whether a user ID and a password transmitted from the client communication terminal 101 are consistent with those managed in the database server 112 (step S1101).

In step S1101, if the user registration information is determined to be managed and stored in the database server 112 (YES in step S1101), the photo site 110 permits the client communication terminal 101 to login. Then, the web server 111 determines the operating state of the settlement site 130 (step S1102).

In the present embodiment, determination of the operating state of the settlement site 130 can be realized by well-known art. For example, the web server 111 executes a ping to transmit a packet to the settlement site 130 using the Internet Control Message Protocol (ICMP). Then, if the reply is received, the settlement site 130 is in a communicable state and is determined to be in operation. On the other hand, if the reply is not received, the settlement site 130 is determined to be not in a communicable state or to be out of operation.

Alternatively, if the settlement site 130 becomes out of operation due to occurrence of an obstacle or maintenance work, the state can automatically be notified to the photo site 110 via a network. Then, the photo site 110 that has received the notice can associate the contents of the notice with the settlement site 130 as information on the operating state to register the information with the database server 112.

Or in the alternative, if the settlement site 130 becomes out of operation due to occurrence of an obstacle or maintenance work, an operator at the settlement site 130 can notify an operator at the photo site 110 using communication units such as electronic mail or telephone. Then, the operator at the photo site 110 who has received the notice can input the state to the web server 111, associate the information with the settlement site 130, and manage the information in the database server 112.

In step S1102, if it is determined that the settlement site 130 is in operation (YES in step S1102), the photo site 110 acquires web page information for displaying the image album browsing screen including a button to instruct a print order on the web browser (step S1103). In the present embodiment, the photo site 110 can generate the web page information on the image album browsing screen each time, or read the web page information generated beforehand and stored from the hard disk.

Then the photo site 110 transmits the web page information on the image album browsing screen including a button for instructing a print order to the client communication terminal 101 (step S1105). An example of the image album browsing screen including a button for requesting a print order is shown in FIG. 5.

On the other hand, in step S1102, if it is determined that the settlement site 130 is out of operation (NO in step S1102), the photo site 110 acquires the web page information for displaying the image album browsing screen without including a button for requiring a print order on the web browser (step S1104).

Figure 12:
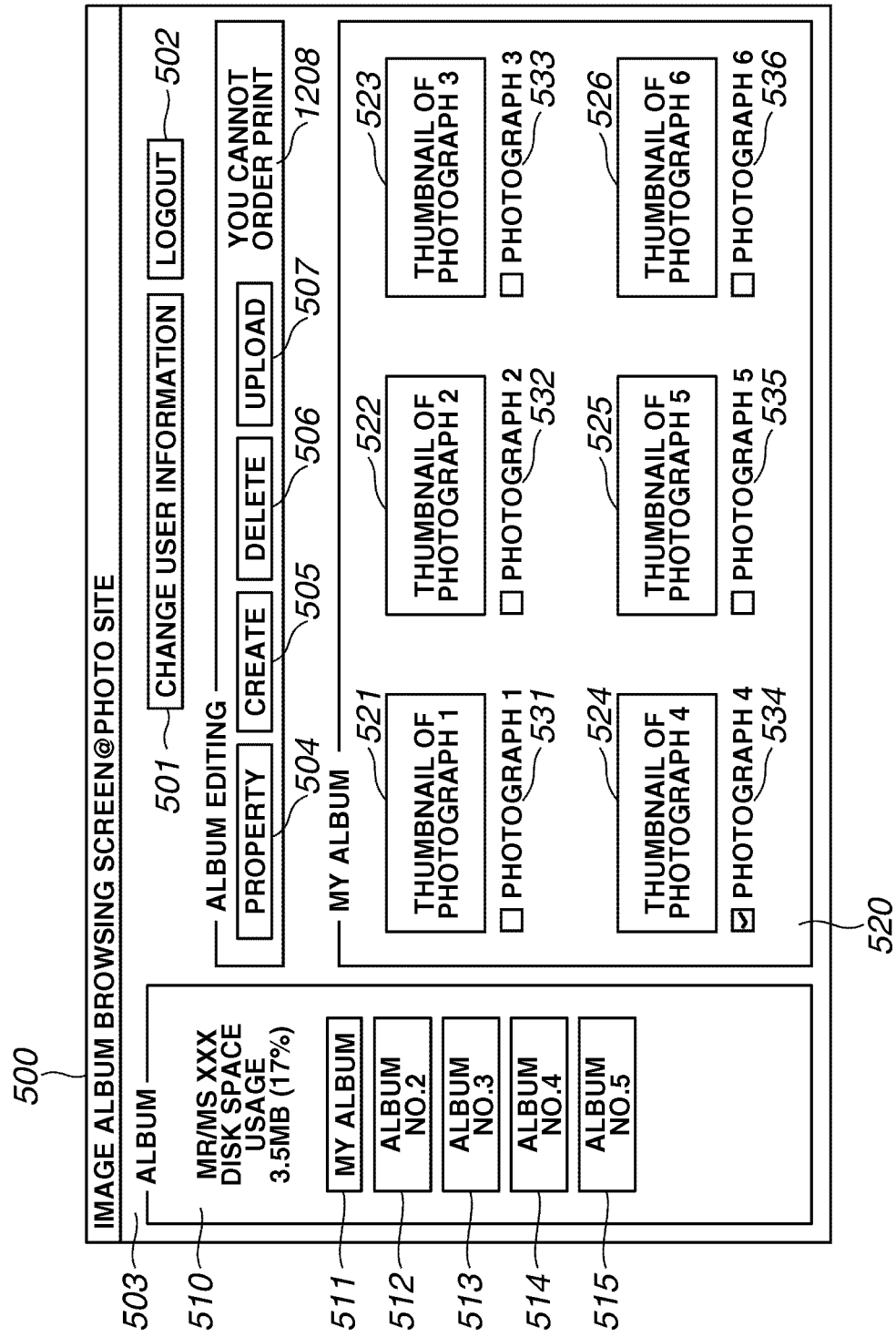
FIG. 12 is a diagram showing an example of an image album browsing screen according to an exemplary embodiment.
Figure 13:
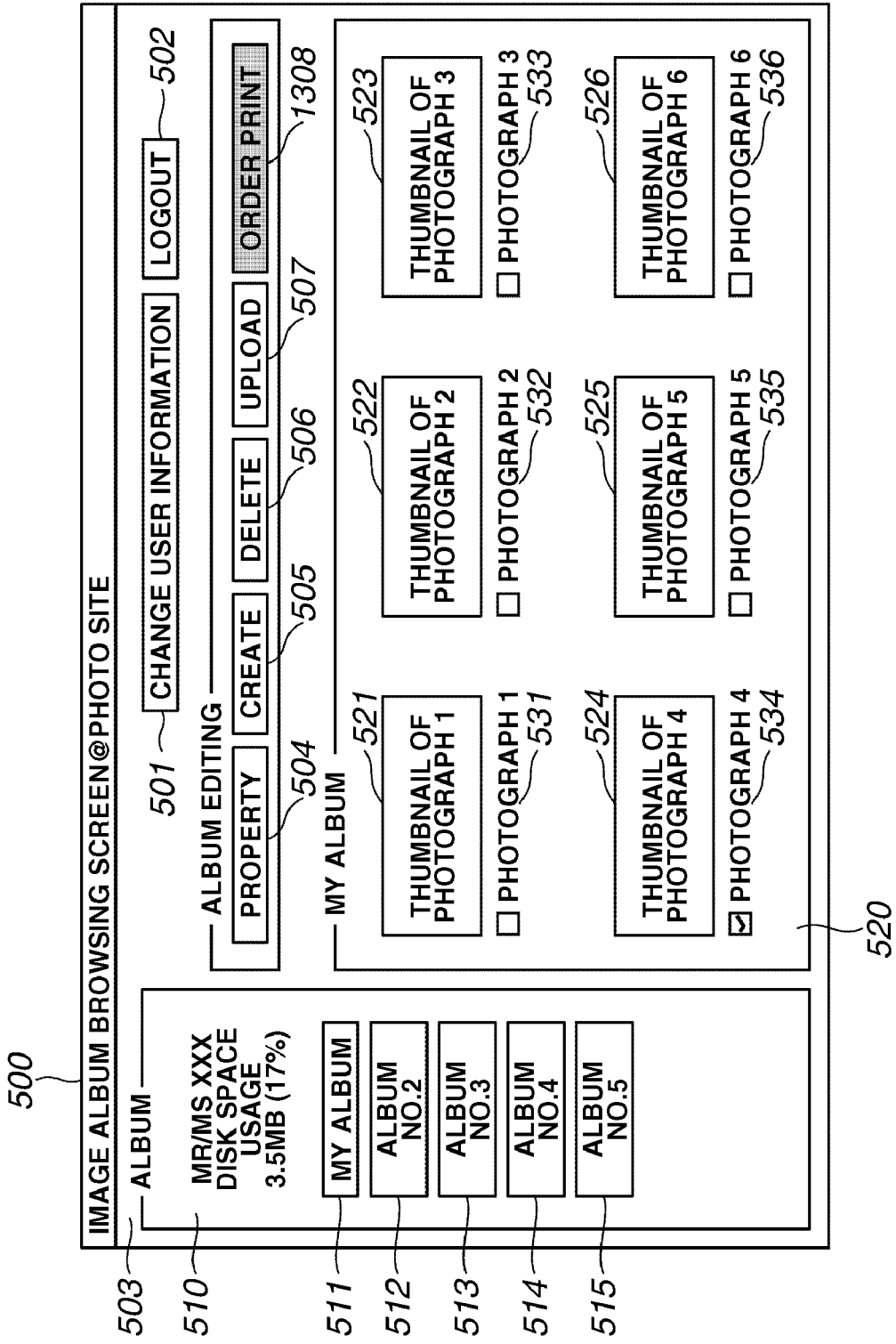
FIG. 13 is a diagram showing an example of an image album browsing screen according to an exemplary embodiment.
Figure 14:
FIG. 14 is a diagram showing an example of an error message dialog according to an exemplary embodiment.

Also, in the present embodiment, the photo site 110 can generate the web page information on the image album browsing screen each time, or read the web page information generated beforehand and stored from the hard disk. Note that as shown in FIG. 12, a message 1208 can also be displayed instead of a button for generating an instruction to order print. Alternatively, as shown in FIG. 13, a button 1308 for requesting a print order can be displayed in an unselectable fashion. Further, on the image album browsing screen, an error message dialog 1400 indicating that the settlement site 130 is out of operation can be displayed as shown in FIG. 14. When such an image album browsing screen is displayed on the web browser, a user of the client communication terminal 101 cannot perform work for a print order.

Further, in step S1101, if it is determined that user registration information is not managed, the photo site 110 does not permit the client communication terminal 101 to login and transmits an error notification (step S1106).

In the present embodiment, when the client communication terminal 101 accesses the print site 120 and the settlement site 130 in turn to order printing for an image file uploaded to the photo site 110, the photo site 110 first determines the operating state of the settlement site 130. Then, the photo site 110 controls access to the print site 120 by the client communication terminal 101 in accordance with the determined operating state.

That is, when a communication terminal accesses a first information processing apparatus and a second information processing apparatus in turn to receive an online service, a service intermediation apparatus controls whether the first information processing apparatus can be used in accordance with an operating state of the second information processing apparatus.

Accordingly, such wasteful work can be reduced that the communication terminal communicates with the first information processing apparatus although the online service is not obtained since the second information processing apparatus cannot be used.

Second Exemplary Embodiment

In a second exemplary embodiment, a user does not pay a print charge using the settlement site 130 such as a credit card, but can pay using an electronic coupon managed by the photo site 110. Here, the description of similar components as those of the first exemplary embodiment is not repeated, and only characteristic components of the second exemplary embodiment will be described in detail.

In the second exemplary embodiment, for a user of the client communication terminal 101, the database server 112 of the photo site 110 manages record information stored with a user ID, a user name, a password and a coupon number by a user information table. An example of the user information table 1500 is shown in FIG. 15. Further, the database server 112 manages record information stored with a coupon number, an object product, an object print site, an expiry date, a flag indicating whether spent or not, and a user ID of a user having the coupon by a coupon information table. An example of the coupon information table 1600 is shown in FIG. 16. Further, the database server 112 manages record information stored with a name, a handling product, URL information at the print site 120 by a print site information table. An example of the print site information table 1700 is shown in FIG. 17.

Figure 18:
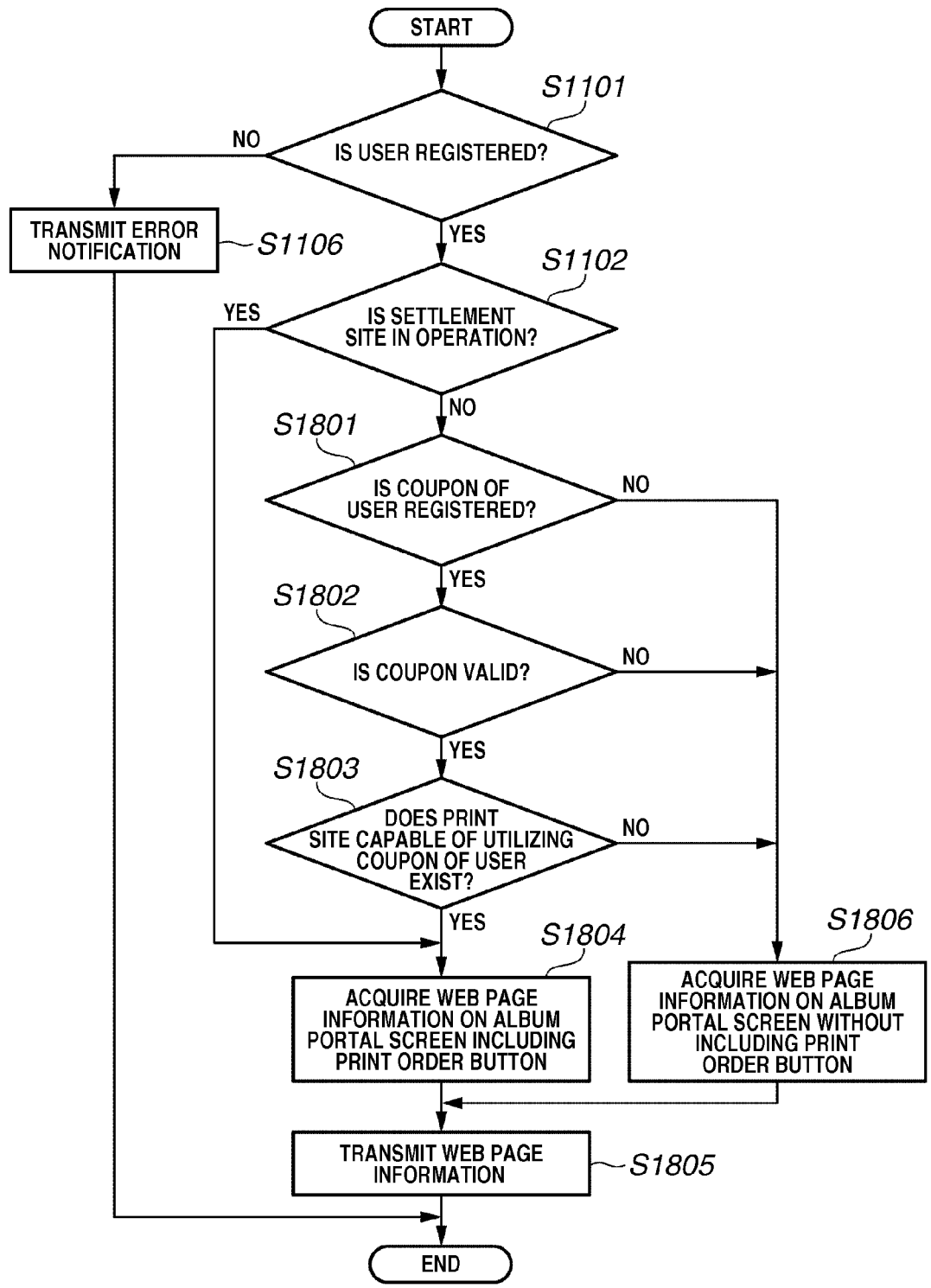
FIG. 18 is a flowchart showing an example procedure for print order processing according to an exemplary embodiment.

An exemplary processing procedure executed by the photo site 110 in the second exemplary embodiment in step S402 shown in FIG. 4 will be described with reference to FIG. 18. The CPU 301 of each server included in the photo site 110 reads program code and executes various processing. Thus, the following procedure is implemented.

Figure 11:
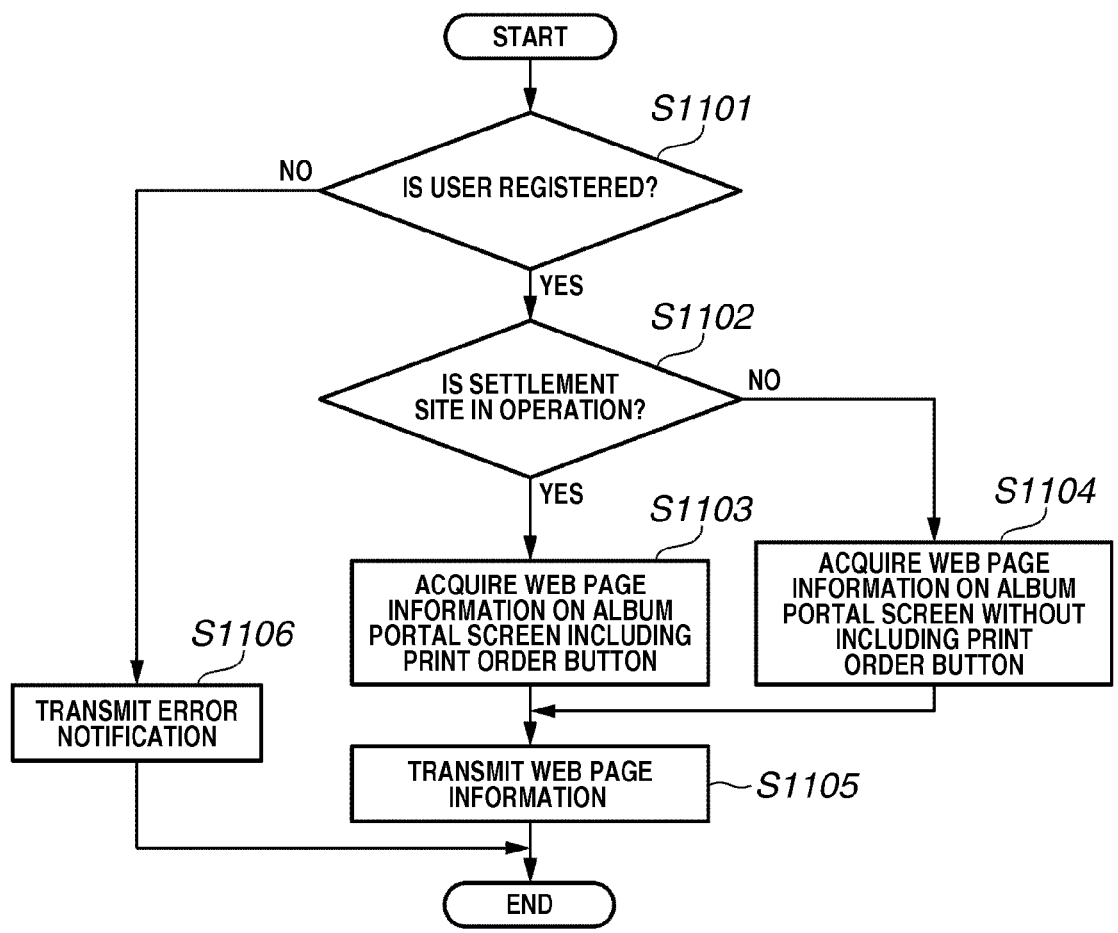
FIG. 11 is a flowchart showing an example procedure for print order processing according to an exemplary embodiment.

First, the photo site 110 executes similar processing as steps S1101 and S1102 shown in FIG. 11. In step S1102, if it is determined that the settlement site 130 is out of operation (YES in step S1102), the photo site 110 refers to the user information table 1500 (see FIG. 15) based on a user ID of a user of the client communication terminal 101 who requests login. Then, the photo site 110 determines whether a coupon number is stored in the record information (step S1801).

In step S1801, if the coupon number is stored (YES in step S1801), the photo site 110 refers to a coupon information table 1600. Then, the photo site 110 determines whether the coupon is valid (step S1802). Here, if the record information corresponding to the coupon number of the user is stored with a value indicating that the coupon is already used or that the date of expiry is expired, the photo site 110 determines that the coupon is not valid.

In step S1802, if it is determined that the coupon is valid (YES in step S1802), the photo site 110 refers to the coupon information table 1600 and a print site information table 1700 based on the coupon number acquired in step S1801. Then, the web server 111 determines whether the printer site 120 is present which can utilize the coupon possessed by the user of the client communication terminal 101 (step S1803).

In step S1803, if it is determined that the print site 120 is present (YES in step S1803), the photo site 110 acquires the web page information on the image album browsing screen including a button for requesting a print order as shown in FIG. 5 (step S1804). Then, the photo site 110 transmits the web page information acquired in step S1804 to the client communication terminal 101 (step S1805).

On the other hand, if it is determined that the coupon number is not stored in step S1801, the coupon is not valid in step S1802, or the print site 120 is not present which can be utilized by a user, the photo site 110 acquires the web page information on the image album browsing screen without including a button for requesting a print order or the image album browsing screen such as that shown in FIG. 12 or 13 (step S1806). Then, the photo site 110 transmits the web page information acquired in step S1806 to the client communication terminal 101 (step S1805).

Figure 19:
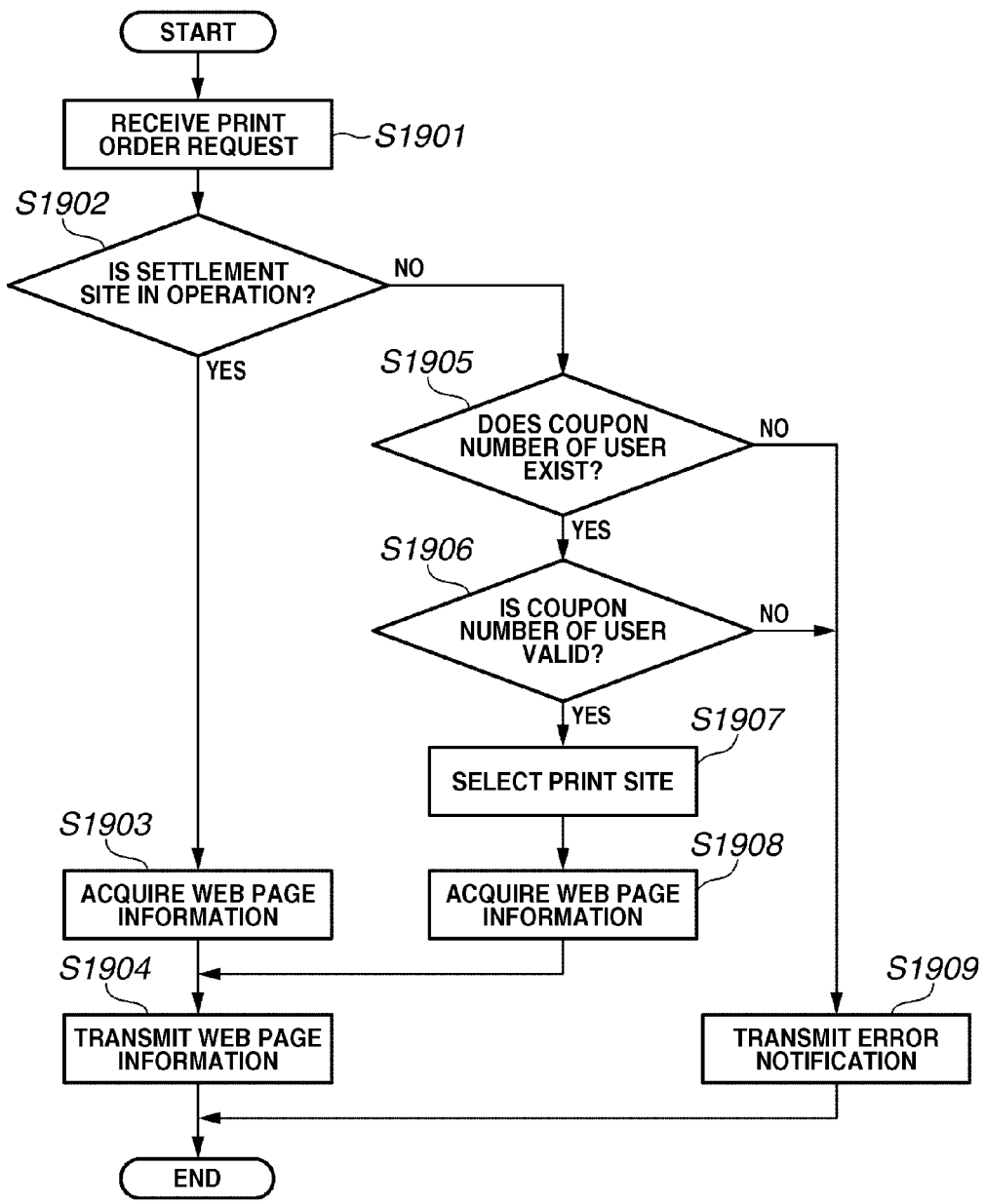
FIG. 19 is a flowchart showing an example procedure for print order processing according to an exemplary embodiment.

Next, exemplary processing in step S405 (from FIG. 4) when the web page information on the image album browsing screen including a button for generating an instruction a print order is transmitted from the photo site 110 to the client communication terminal 101 in step S1805 will be described. A processing procedure executed by the photo site 110 in step S405 will be described below with reference to FIG. 19.

First, the photo site 110 receives a print order request from the client communication terminal 101 (step S1901). In the present embodiment, the client communication terminal 101 transmits the print order request to the photo site 110 in response to a user pressing the button 508 for requesting a print order.

Then, the photo site 110 determines whether the settlement site 130 is in operation (step S1902). In the present embodiment, the photo site 110 can newly determine the operating state of the settlement site 130. Alternatively, the photo site 110 can store the operating state determined in the above-described step S1101 and read the operating state.

In step S1902, if it is determined that the settlement site 130 is in operation (YES in step S1902), the photo site 110 acquires the web page information for displaying the print order portal screen as shown in FIG. 6 on the web browser (step S1903). In the print order portal screen 600 shown in FIG. 6, since it is determined that the settlement site 130 can be utilized, all of the print sites are displayed in a selectable fashion. Note that all of the print sites 120 can pay utilizing the settlement site 130. Then, the photo site 110 transmits the web page information on the print order portal screen acquired in step S1903 to the client communication terminal 101 (step S1904).

On the other hand, in step S1902, if it is determined that the settlement site 130 is out of operation (NO in step S1902), the photo site 110 refers to the user information table 1500 based on a user ID notified from the client communication terminal 101 in step S401. Then, the photo site 110 determines whether a coupon number is stored in the record information (step S1905). If the coupon number is stored in the user record information (YES in step S1905), the photo site 110 determines whether the coupon is valid in a manner similar to that in step S1802 (step S1906).

In step S1906, if it is determined that the coupon is valid (YES in step S1906), the photo site 110 refers to the coupon information table 1600 and the print site information table 1700 based on the coupon number to acquire a print site that a user can utilize (step S1907). That is, the photo site 110 selects and acquires a print site in which a handling product on the print site information table 1700 consistent with an object product on the coupon information table 1600 is registered. Further, the photo site 110 also acquires information such as products, amounts, and quantities for which a coupon can be utilized at each print site 120. Then, the web server 111 acquires the web page information on the print order portal screen which displays a list of the print sites 120 which can utilize the coupon of a user (step S1908). Note that the web page information on the print order portal screen can be generated each time or can be read from the hard disk.

Figure 20:
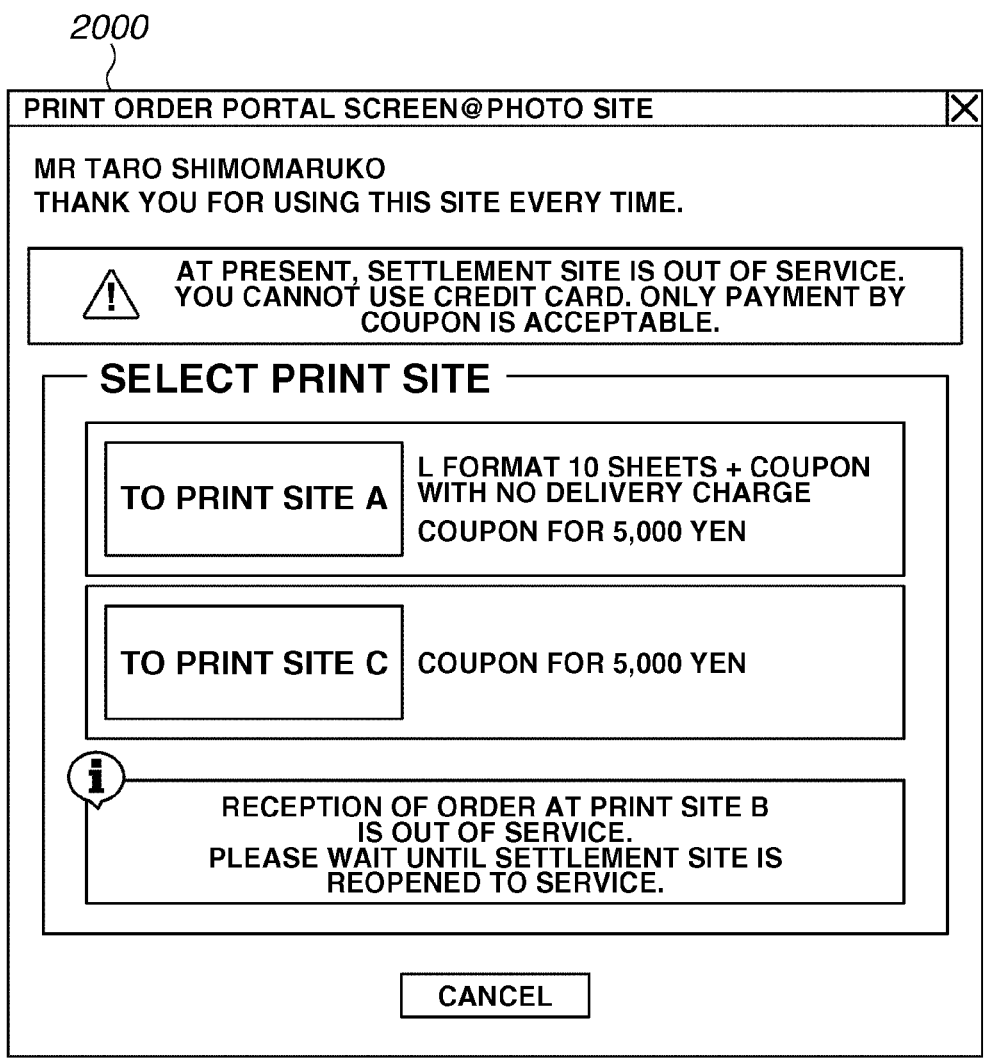
FIG. 20 is a diagram showing an example of a print order portal screen according to an exemplary embodiment.

Then, the photo site 110 transmits the web page information on the print order portal screen acquired in step S1908 to the client communication terminal 101 (step S1904). An example of the print order portal screen 2000 displayed on the web browser based on the web page information transmitted in step S1904 is shown in FIG. 20. In the case of FIG. 20, since a user "Taro shimomaruko" has valid coupons as coupon numbers "0125867" and "3980095", a print site A and a print site C can be utilized. Accordingly, on a print order portal screen 2000, the print site A and the print site C are displayed to be usable.

On the other hand, if it is determined that a coupon number is not present in step S1905 or a coupon is not valid in step S1906, the photo site 110 transmits an error notification (step S1909).

Note that if a user accesses one of the print sites 120 selected in step S1907 and carries out print order processing (steps S406 to S409), the print site 120 requests the photo site 110 to execute settlement (step S413). In response to this settlement request, the photo site 110 transmits the web page information for displaying a coupon payment screen as shown in FIG. 21A to the client communication terminal 101 instead of generating an instruction for redirection to the settlement site 130.

FIG. 21A is a diagram showing an example of a coupon payment screen 2100 displayed on the web browser. On an area 2101, a print-ordered product name, a unit price, a quantity, a commission, a delivery charge, and a total amount are displayed. An area 2102 serves as a coupon number entry field and an area 2103 serves as a button for generating an instruction to reflect a coupon to an amount of payment. Further, a button 2104 is provided to go back to the previous screen and a button 2105 may be used to cancel the operation. If the photo site 110 receives an instruction to authenticate a coupon, the photo site 110 refers to the coupon information table to determine whether record information consistent with the entered coupon number is present. If the record information consistent therewith is present, the entered coupon number is determined to be valid and a print charge is recalculated.

The coupon payment screen 2100 after the print charge has been recalculated is shown in FIG. 21B. In FIG. 21B, when the user "Taro Shimomaruko" utilizes a coupon number "0125867", the coupon payment screen 2100 indicates that an amount for 3 sheets of L format, a commission, and a delivery charge are subtracted from the coupon, and a total amount becomes 0 Yen. Then, a button 2106 for generating an instruction to start settlement utilizing the coupon is newly displayed.

Note that as a result of recalculating the print charge, if the total amount does not become 0 Yen, since a user cannot supplement a charge utilizing the settlement site 130, a message 2206 indicating that printing cannot be ordered is displayed as shown in FIG. 22 instead of the button 2106.

On the other hand, if the record information consistent with the entered coupon number is not present in the coupon information table, the entered coupon number is determined to be invalid and an error is notified to the client communication terminal 101.

Further, if the settlement site 130 is in an operating state and a user has a coupon that can be utilized, the photo site 110 can transmit the web page information to the client communication terminal 101 in response to a settlement request from the print site 120 in step S411. In the present embodiment, the web page information serves to display a settlement method selection screen.

Figure 23A:
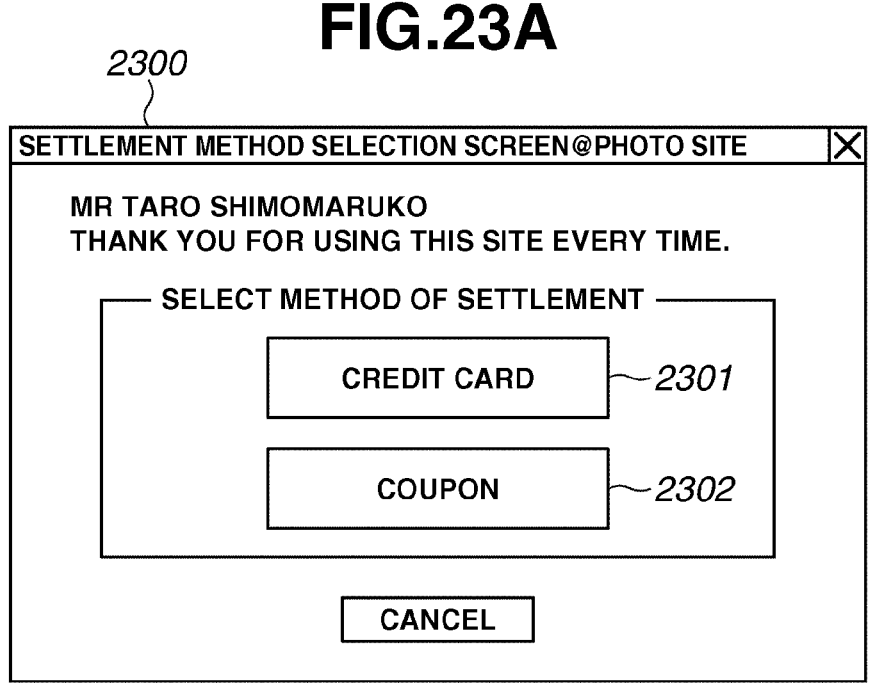
FIGS. 23A and 23B are diagrams showing an example of a settlement method selection screen according to an exemplary embodiment.

An example of the settlement method selection screen is shown in FIG. 23A. On a settlement method selection screen 2300 shown in FIG. 23A, buttons 2301 and 2302 for selecting either a credit card or a coupon are displayed. In the present embodiment, if the button 2301 for a credit card is selected, the photo site 110 transmits the web page information for displaying the URL information on the settlement site 130 and an instruction for redirection to the settlement site 130 to the client communication terminal 101. Further, if the button 2302 for a coupon is selected, the photo site 110 transmits the web page information for displaying the coupon payment screen 2100 to the client communication terminal 101.

Figure 23B:
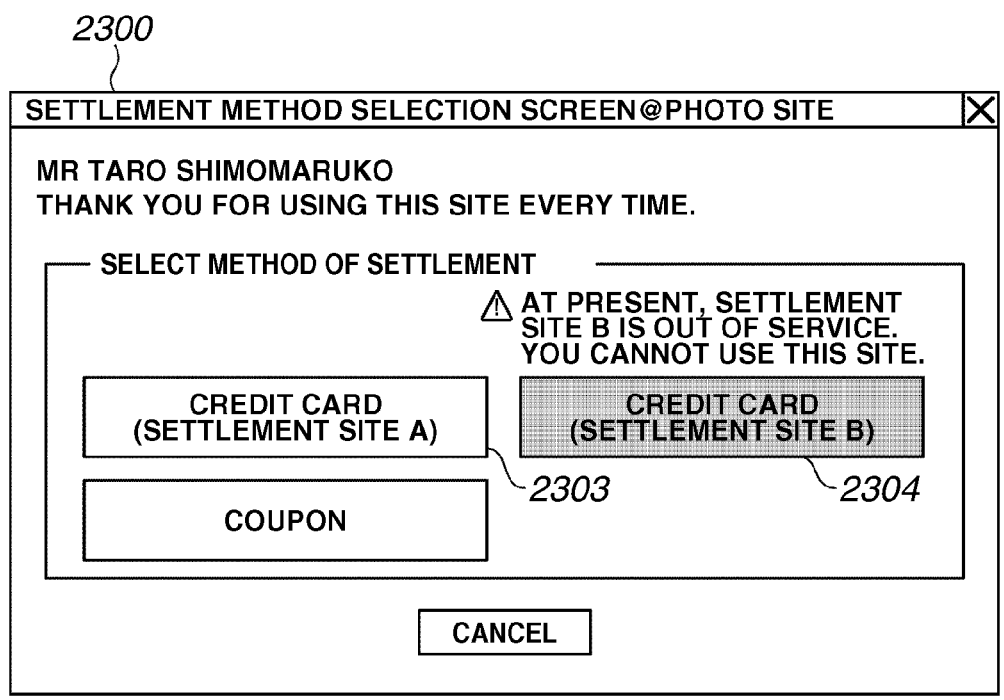

Further, if there are a plurality of settlement sites 130 and there are a settlement site in operation and a settlement site out of operation among the plurality of settlement sites, a button 2303 for generating an instruction to perform settlement in a settlement site A that is in operation is displayed in a selectable fashion, and a button 2304 for generating an instruction to perform settlement in a settlement site B that is out of operation is grayed out to be displayed in an unselectable fashion, as shown in FIG. 23B.

Note that in the present embodiment, a case has been described in which one settlement site is present, but a plurality of settlement sites can be present. In this case, if it is determined in step S1902 that the settlement site 130 is in operation, the photo site 110 acquires information on the type of the settlement site 130. Further, the photo site 110 stores information concerning the settlement site 130 with which the print site 120 cooperates in record information on the print site information table. Then, the photo site 110 makes the print site 120 cooperating with the settlement site 130 in operation as a candidate of the user-usable print site 120 and selects the user-usable print site 120 from among the candidates in step S1907.

As described above, according to the present embodiment, the photo site 110 determines the operating state of the settlement site 130 and the information concerning a coupon possessed by a user of the client communication terminal 101. Then, in accordance with a determined result, the photo site 110 controls access to the print site 120 by the client communication terminal 101.

Thus, when a communication terminal accesses a first information processing apparatus and a second information processing apparatus in turn to receive an online service, a service intermediation apparatus control whether the first information processing apparatus can be used in accordance with an operating state of the second information processing apparatus and attribute information on a user.

Accordingly, even if the second information processing apparatus cannot be used, a user can receive the online service if the communication terminal can utilize an alternative method.

Note that in the first and second exemplary embodiments, a case has been described in which the client communication terminal 101 that has uploaded an image file to the photo site 110 requests a print order for the image file. However, other devices can also request the print order. In this case, URL information for displaying an image album browsing screen on the web browser of other devices and a password are notified from the photo site 110 or the client communication terminal 101 to the other devices.

Other Exemplary Embodiments

The present invention can also be achieved by supplying a storage medium storing program code of software to realize functions of the above-described embodiments to a system or an apparatus, reading the program code from the storage medium by a computer (or CPU or MPU) of the system or the apparatus, and executing the program code. In this case, the program code itself read from the storage medium realizes the functions of the above-described embodiments. Accordingly, the storage medium storing the program code configures the present invention.

As the storage medium for supplying the program code, for example, a flexible disk, a hard disk, an optical disk, a magneto-optical disk, a CD-ROM, a CD-R, a magnetic tape, a nonvolatile memory card, a ROM, a DVD, or the like can be used.

Further, the functions of the above-described embodiments can be realized by executing not only the program code read by a computer but also a part or the whole of actual processing by an operating system (OS) or the like running on the computer based on a command of the program code.

Furthermore, the program code read from the storage medium can be written into a memory provided in a function expansion board inserted into a computer or a function expansion unit connected to a computer. Then, the functions of the above-described embodiments can be realized by executing a part or the whole of actual processing by a CPU included in the function expansion board or the function expansion unit based on a command of the program code.

According to an exemplary embodiment, when a user accesses a plurality of information processing apparatuses in turn to receive a service, the user can quickly know a state in which the service cannot be utilized. Thus, the user does not need to perform a wasteful operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-300356 filed Oct. 14, 2005, which is hereby incorporated by reference herein in its entirety.

What is claimed:

1. An information processing apparatus capable of communicating with a print processing device for executing a print processing of an image file and a settlement device for executing settlement of an expense involved in the print processing via a network, the image information processing apparatus comprising:
   a processor for executing a processing step executable for a computer; and
   a memory for storing the processing step executable for a computer, the processing step comprising the steps of:
   determining whether the settlement device is operating or not;
   transmitting screen information including a first link information for access to the print processing device to a user terminal, in case where determined that the settlement device is operating, and transmitting the screen information not including the first link to the user terminal, in case where determined that the settlement device is not operating;
   receiving a request of settlement of the expense involved in the print processing from the print processing device, when the screen information including the first link information is transmitted to the user terminal and the user terminal accesses the print processing device on the bases of the first link information of the screen information; and
   transmitting screen information including a second information for access to the settlement device to the user terminal in correspondence with the request,
   wherein the user terminal accesses the settlement device on the bases of the second link of the screen information and requests the settlement to the settlement device.

2. The information processing apparatus according to claim 1, further comprising the steps of:
   receiving the image file from the user terminal;
   storing the received image file in a storage device; and
   transmitting the image file to the print processing device by reading out the image file from the storage device.

3. The information processing apparatus according to claim 1, further comprising the steps of:
   relating a user of the user terminal and predetermined information and storing the information in the storage device;
   determining whether the predetermined information is stored in the storage device by related with the user in case where the settlement device is not operating according to the determination result; and
   transmitting the screen information including the first link information for access to the print processing device which corresponds to the predetermined information, to the user terminal, in case where the predetermined information is stored in the storage device by related with the user, and transmitting the screen information not including the first link information for access to the print processing device which corresponds to the predetermined information, to the user terminal, in case where the predetermined information is not stored in the storage device by related with the user.

4. A method utilized in an information processing apparatus capable of communicating with a print processing device for executing a print processing of an image file and a settlement device for executing settlement of an expense involved in the print processing via a network, the information processing apparatus including a processor and memory, the method comprising:
   utilizing the processor for executing processing steps executable in the information processing apparatus;
   utilizing the memory for storing the processing steps executable in the information processing; and
   performing the following processing steps, including,
   determining whether the settlement device is operating or not;
   transmitting screen information including a first link information for access to the print processing device to a user terminal, in case where determined that the settlement device is operating, and transmitting the screen information not including the first link to the user terminal, in case where determined that the settlement device is not operating;
   receiving a request of settlement of the expense involved in the print processing from the print processing device, when the screen information including the first link information is transmitted to the user terminal and the user terminal accesses the print processing device on the bases of the first link information of the screen information; and
   transmitting screen information including a second information for access to the settlement device to the user terminal in correspondence with the request,
   wherein the user terminal accesses the settlement device on the bases of the second link of the screen information and requests the settlement to the settlement device.

5. A computer readable storage medium containing computer-executable instructions for controlling an information processing apparatus capable of communicating with a print processing device for executing a print processing of an image file and a settlement device for executing settlement of an expense involved in the print processing via a network, the information processing apparatus including a processor for executing the computer-executable instructions and memory for storing the computer-executable instructions, the medium comprising:
   computer-executable instructions for determining whether the settlement device is operating or not;
   computer-executable instructions for transmitting screen information including a first link information for access to the print processing device to a user terminal, in case where determined that the settlement device is operating, and transmitting the screen information not including the first link to the user terminal, in case where determined that the settlement device is not operating;
   computer-executable instructions for receiving a request of settlement of the expense involved in the print processing from the print processing device, when the screen information including the first link information is transmitted to the user terminal and the user terminal accesses the print processing device on the bases of the first link information of the screen information; and
   computer-executable instructions for transmitting screen information including a second information for access to the settlement device to the user terminal in correspondence with the request,
   wherein the user terminal accesses the settlement device on the bases of the second link of the screen information and requests the settlement to the settlement device.

* * * * *